(12) United States Patent
Verhees et al.

(10) Patent No.: US 12,170,355 B2
(45) Date of Patent: Dec. 17, 2024

(54) PROCESS FOR THE RECOVERY OF METALS FROM A Li-CONTAINING STARTING MATERIAL

(71) Applicant: UMICORE, Brussels (BE)

(72) Inventors: Pieter Verhees, Olen (BE); Bart Klaasen, Olen (BE); Willem Callebaut, Hoboken (BE)

(73) Assignee: UMICORE, Brussels (BE)

( * ) Notice: Subject to any disclaimer, the term of this patent is extended or adjusted under 35 U.S.C. 154(b) by 575 days.

(21) Appl. No.: 17/603,998

(22) PCT Filed: Apr. 17, 2020

(86) PCT No.: PCT/EP2020/060890
§ 371 (c)(1),
(2) Date: Oct. 15, 2021

(87) PCT Pub. No.: WO2020/212587
PCT Pub. Date: Oct. 22, 2020

(65) Prior Publication Data
US 2022/0223933 A1    Jul. 14, 2022

(30) Foreign Application Priority Data
Apr. 19, 2019    (EP) .................................... 19170392

(51) Int. Cl.
*H01M 10/00*    (2006.01)
*C22B 1/00*    (2006.01)
(Continued)

(52) U.S. Cl.
CPC ............. *H01M 10/54* (2013.01); *C22B 1/005* (2013.01); *C22B 7/003* (2013.01); *C22B 7/007* (2013.01);
(Continued)

(58) Field of Classification Search
CPC .......... H01M 10/54; C22B 26/12; C22B 3/00; C22B 47/00; C22B 7/00
See application file for complete search history.

(56) References Cited

U.S. PATENT DOCUMENTS

| | | |
|---|---|---|
| 2019/0032227 A1 | 1/2019 | Lipp et al. |
| 2019/0152797 A1 | 5/2019 | Liu et al. |
| 2022/0216534 A1 | 7/2022 | Oosterhof et al. |

FOREIGN PATENT DOCUMENTS

| | | |
|---|---|---|
| CL | 2018001813 A1 | 10/2018 |
| CL | 2021002723 A1 | 5/2022 |

(Continued)

OTHER PUBLICATIONS

Cao et al. Method for Extracting Lithium in the Slag Generated From Pyrometallurgical Recycling Lithium Battery Of, May 2018, See the Abstract. (Year: 2018).*

(Continued)

*Primary Examiner* — Anca Eoff
*Assistant Examiner* — Monique M Wills
(74) *Attorney, Agent, or Firm* — NK Patent Law

(57) ABSTRACT

The invention concerns a process for the recovery of metals such as Ni and Co from a Li-containing starting material. In particular, this process concerns the recovery of metals M from a Li-containing starting material, wherein M comprises Ni and Co, comprising the steps of:
Step 1: Providing said starting material, comprising Li-ion batteries or their derived products;
Step 2: Removing Li in an amount of more than the maximum of (1) 30% of the Li present in said starting material, and (2) a percentage of the Li present in said starting material determined to obtain a Li:M ratio of less than 0.70 in a subsequent acidic leaching step;
Step 3: Subsequent leaching using relative amounts of Li-depleted product and a mineral acid, thereby obtaining a Ni- and Co-bearing solution; and, (Continued)

Figure 1:
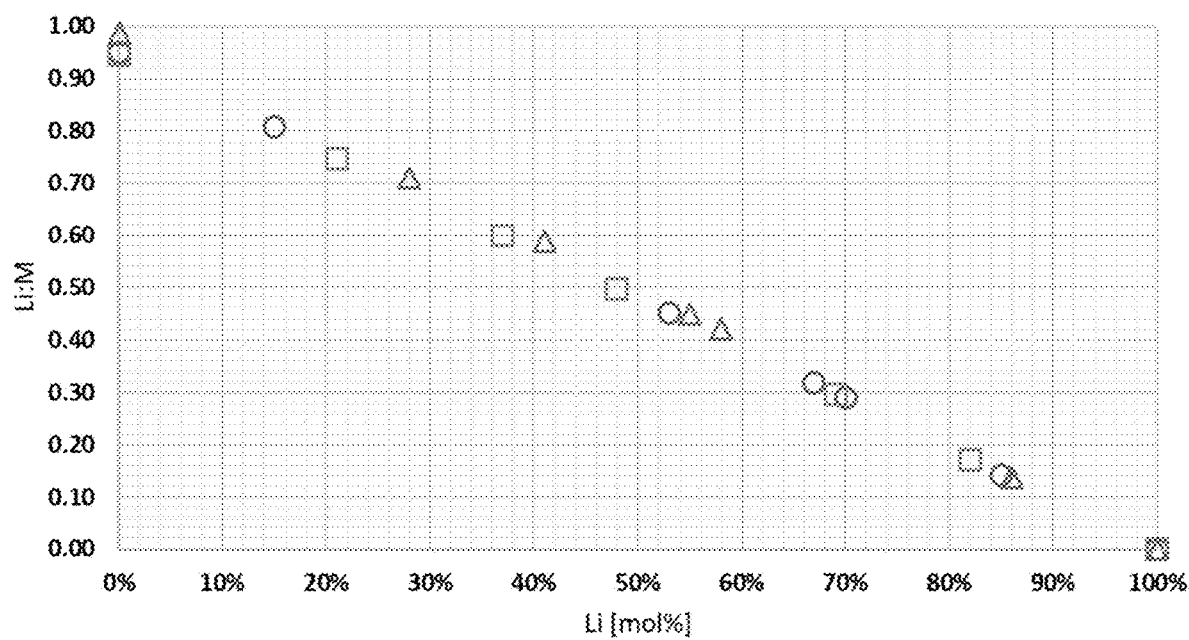

Step 4: Crystallization of Ni, Co, and optionally Mn.

Due to the lower reagent consumption and higher Ni and/or Co concentration during hydrometallurgical processing, the invention is an efficient and economic process for the production of crystals suitable for battery material production.

14 Claims, 2 Drawing Sheets

(51) Int. Cl.
    *C22B 3/00*     (2006.01)
    *C22B 7/00*     (2006.01)
    *C22B 26/12*     (2006.01)
    *C22B 47/00*     (2006.01)
    *H01M 6/52*     (2006.01)
    *H01M 10/54*     (2006.01)

(52) U.S. Cl.
    CPC ...... *C22B 23/0415* (2013.01); *C22B 23/0492* (2013.01); *C22B 26/12* (2013.01); *C22B 47/00* (2013.01); *H01M 6/52* (2013.01)

(56) References Cited

FOREIGN PATENT DOCUMENTS

| | | | | |
|---|---|---|---|---|
| CN | 107666022 A | 2/2018 | | |
| CN | 107768763 A | 3/2018 | | |
| CN | 107974562 A | 5/2018 | | |
| CN | 108063295 A | * 5/2018 | ............ | H01M 10/54 |
| CN | 108439438 A | 8/2018 | | |
| CN | 109244580 A | 1/2019 | | |
| EP | 2677048 A1 | 12/2013 | | |
| JP | 2012224877 A | 11/2012 | | |
| WO | 2018076993 A1 | 5/2018 | | |

OTHER PUBLICATIONS

ISA/EP; International Search Report and Written Opinion for International Patent Application No. PCT/EP2020/060890 dated Jul. 14, 2020, 14 pages.
WIPO; International Preliminary Report on Patentability for International Patent Application No. PCT/EP2020/060890 dated Jul. 28, 2021, 22 pages.
Pratima, Meshram, et al., "Extraction of lithium from primary and secondary sources by pre-treatment, leaching and separation: a comprehensive review", Hydrometallurgy, vol. 150, Dec. 1, 2014.
Georgi-Maschler, et al., "Development of a recycling process for Li-ion batteries", Journal of Power Sources, vol. 207, Feb. 7, 2012.
Hu, Juntao, et al., "A promising approach for the recovery of high value-added metals from spent lithium-ion batteries", Journal of Power Sources, Elsevier SA, vol. 351, Mar. 29, 2017.
Weiguang LV, et al., "A Critical Review and Analysis on the Recycling of Spent Lithium-Ion Batteries", Sustainable Chemistry & Engineering, vol. 2018, No. 6, Dec. 13, 2017, 14 pages.
INAPI; Search Report for Chilean Patent Application No. 202102722 dated Dec. 16, 2022, 3 pages.
JPO; Office Action from Corresponding JP Patent Application No. 2021-561981, mailed Mar. 25, 2024, English Translation, 8 pages.
Pratima Meshram et al., "Extraction of lithium from primary and secondary sources by pre-treatment, leaching and separation: A comprehensive review", Hydrometallurgy, NL, Elsevier, Oct. 23, 2014, vol. 150, pp. 192-208.

* cited by examiner

PROCESS FOR THE RECOVERY OF METALS FROM A Li-CONTAINING STARTING MATERIAL

CROSS-REFERENCE TO RELATED APPLICATIONS

This application is a U.S. National Stage application of International Patent Application No. PCT/EP2020/060890, filed on Apr. 17, 2020, which claims the benefit of European Patent Application No. 19170392.5, filed on Apr. 19, 2019.

TECHNICAL FIELD AND BACKGROUND

The present disclosure is related to a process for the recovery of metals from a starting material, comprising Ni and Co, and subsequent production of battery precursors used for lithium-ion rechargeable batteries.

One of the prevailing battery chemistries involves cathode powders containing the metals lithium, nickel, manganese, and cobalt (NMC). Another heavily used chemistry makes use of cathode powders containing lithium, nickel, cobalt and aluminum (NCA).

During the lifecycle of a lithium-ion battery, a variety of waste materials is produced that needs to be recycled to be compliant with the environmental regulation and legislation. Already during the manufacturing process of the batteries, production waste is generated due to hard to meet quality standards. Such materials vary from cathode powders, electrode foils, separator foils, to complete battery cells or modules.

Besides production waste, also end-of-life batteries need to be recycled. This results in even more complex waste streams, mainly comprising lithium batteries including all their ingredients together with electrical or electronical components, but possibly also comprising amounts of non-lithium batteries such nickel-cadmium, nickel-metal-hydride and zinc batteries. Derivatives of these production wastes and end-of-life batteries are also available for recycling, in the form of powder fractions or black masses, which are the result of a mechanical and/or thermal pre-treatment.

The chemical complexity of scrapped materials increases towards the end of the manufacturing process, as more and more ingredients are added to the product. Hence, battery cells and modules may contain a huge number of different elements, for example Ni, Co, Mn, Li, Fe, Al, V, P, F, C, Ti and Mg in the cathode, Li, Ti, Si, C, Al and Cu in the anode, Li, F, P and volatile organic compounds in the electrolyte, and Al, Fe, Cu, Ni, Cr and plastics with Cl and Br in the casing.

The amount of spent batteries is expected to exceed 100,000 tons per year during the coming 10 years, mainly due to the ongoing electrification of the automotive industry. The battery recycling business will grow correspondingly.

One traditional process uses solvent extraction to extract Co and Ni from the purified leach solution containing Li. In another such process, Co and Ni are separated from the leach solution by precipitation, also resulting in a Li containing stream depleted of Ni and Co. The Li in the solution after metal extraction or precipitation is typically removed from solution as $Li_2CO_3$ salt or $Li_3PO_4$ salt, for example with $Na_2CO_3$ or $Na_3PO_4$ stoichiometric with lithium. Meshram et al. [Hydrometallurgy, V. 150, p. 192-208, 2014] describes a process where during the hydrometallurgical refining of Ni and Co, Ni and Co are extracted from the leaching solution by solvent extraction. CN107666022A describes a process in which Li is recovered prior to the hydrometallurgical refining of Ni and Co and where Ni, Co and Mn are extracted from the solution by performing a hydrolysis. CN109244580 also describes a precipitation of the metals as hydroxides, consuming base. These processes have the disadvantage to consume base such as NaOH more than stoichiometrically with regards to Ni and Co.

Another process is known from CN108439438, in which calcined lithium-containing battery waste is acid-leached, producing a Li, Co, Ni, Mn, Al, Fe and Cu containing solution, from which first Cu, Fe and Al are removed, after which Li is removed by extraction with an extraction agent, followed by crystallization of a mixed Ni, Co, Mn sulfate. Such a process is also known from CN107768763, in which the battery waste is leached in acid, after which Cu, Fe and Al are removed from the obtained solution by precipitation, after which Li is removed as LiF, followed by crystallization of a mixed Ni, Co, Mn sulfate.

However, these known processes have disadvantages, for example that in the presence of dissolved Li, the solubility of $NiSO_4$ is significantly reduced. This means that the processing equipment, such as reactors in a recycling factory, can hold only a limited amount of Ni for a given volume, limiting the Ni-producing capacity of the equipment.

During such known processes, significant amounts of acid are consumed to dissolve the contained Li. This can easily amount to 33% of the total acid consumption for typical battery waste. Further reagents are then used to remove the Li. Consequently, Li dissolution and removal results in additional salt discharge.

Also, extraction steps are expensive, because they usually require a costly extraction agent and additional process steps, such as loading the extraction agent with the metal or metals to be removed and stripping the extraction agent.

For economic and environmental reasons, there is therefore a need to achieve a higher Ni concentration in the leached solution than is possible in these known processes, preferably also with a lower consumption of acid for dissolution, with less or no consumption of reagents for removal of Li from the leach solution and, consequently, with a lower salt discharge.

It is therefore an object of the present invention to provide a process for the recovery of metals M from a starting material containing Li-ion batteries or their derived products, wherein M represents Ni and Co, and optionally Mn, and which is advantageous in that a higher concentration of M in the leached solution can be achieved and reduces reagents consumption.

SUMMARY OF THE INVENTION

This objective is achieved by providing a process according to claim 1. In particular, by at least partially removing Li from a starting material. Partially or completely removing Li before leaching Ni and Co is essential for reaching a higher metal concentration for a given volume, such as a higher concentration of Ni, and maintaining it during later processing steps. Thereby an increased treatment capacity of processing equipment is achieved, as well as a reduction of reagent consumption.

Therefore, the present invention concerns a process for the recovery of metals M from a Li-containing starting material, wherein M comprises Ni and Co, comprising the steps of:

Step 1: Providing said starting material, comprising Li-ion batteries or their derived products;
Step 2: Removing Li in an amount of more than the maximum of (1) 30% of the Li present in said starting material, and (2) a percentage of the Li present in said starting material determined to obtain a Li:M ratio of 0.70 or less in a subsequent acidic leaching step, by using either one or more of:
- a pyrometallurgical smelting process using slag-formers, thereby producing one or more of a Li-bearing slag phase and Li-fumes, and a Li-depleted Ni—Co-bearing phase susceptible to be acid-leached;
- a thermal treatment process using a reducing agent, thereby producing a Ni—Co-bearing residue containing at least one water-soluble Li-compound, and selectively removing said at least one Li-compound by washing with an aqueous solution, thereby obtaining a Li-depleted Ni—Co-bearing residue susceptible to be acid-leached;
- a hydrometallurgical leaching process using an aqueous or acidic solution, thereby selectively leaching Li from said starting material, wherein Ni and Co are at least partially insoluble, and solid-liquid separation, thereby obtaining a Li-depleted Ni—Co-bearing residue susceptible to be acid-leached;

Step 3: subsequent leaching using relative amounts of Li-depleted Ni—Co-bearing material, obtained in step 2, and a mineral acid, thereby obtaining a Ni- and Co-bearing solution; and, Step 4: crystallization of Ni, Co, and optionally Mn, wherein step 4 is performed by lowering the temperature of the Ni- and Co-bearing solution and/or by removing water from the Ni- and Co-bearing solution and/or by solvent displacement crystallization.

In an industrial setup, a starting material for a process is sometimes also called "feed" or "metallurgical charge", the latter especially when talking about a metallurgical process such as smelting or metal refining.

Derived products may include all kinds of production scrap from different stages of a battery production, black mass, electrode foils, end-of-life batteries or modules. Li-ion batteries means batteries that use Li as its charge carrier, which includes, for example, different battery types currently on the market, but also upcoming newer battery technologies such as, but not limited to, solid state batteries.

The Li:M ratio is the molar concentration of Li to the total molar concentration of metals M, wherein M is the total molar concentration of Ni+Co+Mn.

FIG. 1 shows how the Li:M ratio obtained in step 3 varies as function of different Li removal yields obtained in step 2 for three different battery scraps: battery scrap without Al and Cu (circle); battery scrap with low Al and Cu content (square); battery scrap with high Al and Cu content (triangle).

Figure 2:
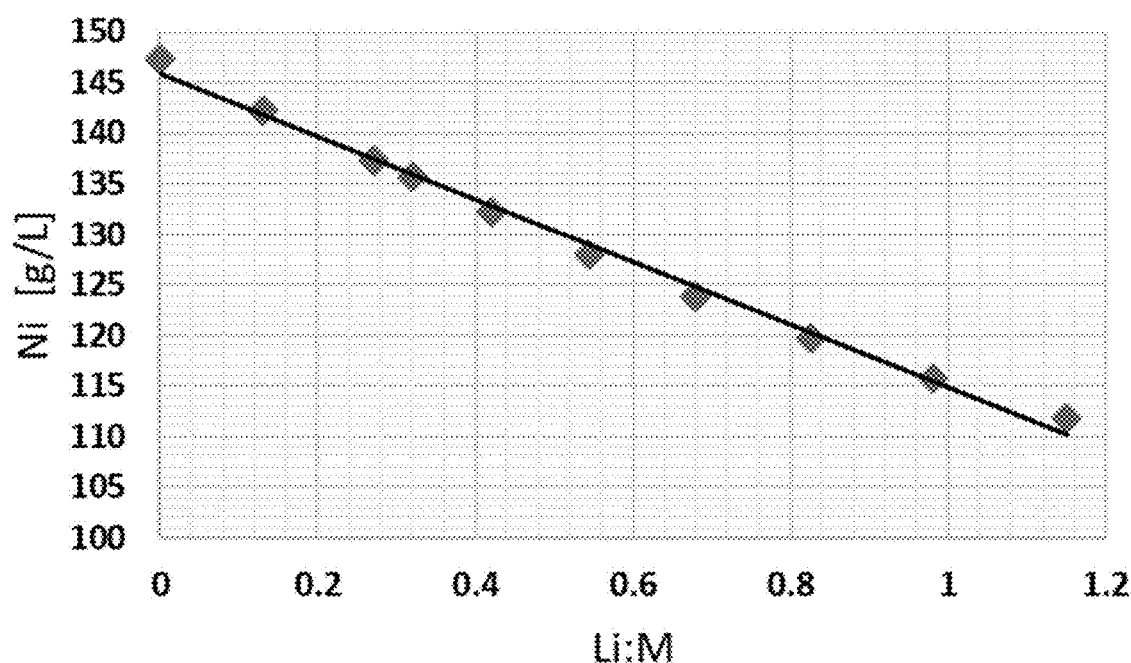

Lowering the Li:M ratio increases for example the solubility of Ni. The solubility of metals such as Ni is much higher in the absence of dissolved Li than in the presence of Li. This is due to the increased concentration of corresponding anions, such as sulfate, when Li is present. FIG. 2 shows the Ni solubility as function of Li:M ratio in case of a solution containing $Li_2SO_4$ and $NiSO_4$. It confirms that the Ni solubility decreases when the Li:M ratio is increasing in case of a solution containing only $NiSO_4$ and $Li_2SO_4$.

Analogously to metal sulfates, the same considerations are applicable to other inorganic metal salts, such as nitrates, chlorides and mixtures thereof, whereby those metals can be Ni, Co, Mn, Fe, Cu, Al and others.

It is noted that step 2 of the process defines two criteria (1) and (2) to apply for the amount of Li to remove and then the higher of the two is selected. While criterion (1), in principle, works for every starting material, criterion (2), i.e. removal of Li to obtain a Li:M ratio of 0.70 or less in a subsequent acidic leaching step, may be preferred for starting materials having a higher Li:M ratio than 0.70 in the starting material before.

A Li:M ratio of 0.70 or less is considered to be relevant in an industrial setup for economic reasons, as it significantly increases the producing capacity of the equipment (compared to traditional methods using the same volume). A Li:M ratio of 0.70 or less corresponds to a metal concentration (excluding Li) of 120 g/L or more (in a sulphate matrix) in the subsequent leaching step 3 of the present invention. Especially for the crystallization step 4, high metal concentrations are beneficial.

In another embodiment, the Li:M ratio of step 2, criterion (2) is 0.50 or less. It is advantageous for the process to have a metal concentration of 128 g/L or more (in a sulphate matrix), which corresponds to a Li:M ratio of 0.50 or less. By removing Li in step 2 of the process, such lower Li:M ratio is obtained in the leach solution.

In another embodiment, step 1 and step 2 of the above process read as follows: Process for the recovery of metals M from a Li-containing starting material, comprising Li-ion batteries or their derived products, wherein M comprises Ni and Co, comprising the steps of:
Step 1: Providing said starting material, having a Li:M ratio of more than 0.50;
Step 2: Removing a percentage of the Li present in said starting material determined to obtain a Li:M ratio of 0.50 or less in a subsequent acidic leaching step, by using either one or more of:
- a pyrometallurgical smelting process using slag-formers, thereby producing one or more of a Li-bearing slag phase and Li-fumes, and a Li-depleted Ni—Co-bearing phase susceptible to be acid-leached;
- a thermal treatment process using a reducing agent, thereby producing a Ni—Co-bearing residue containing at least one water-soluble Li-compound, and selectively removing said at least one Li-compound by washing with an aqueous solution, thereby obtaining a Li-depleted Ni—Co-bearing residue susceptible to be acid-leached;
- a hydrometallurgical leaching process using an aqueous or acidic solution, thereby selectively leaching Li from said starting material, wherein Ni and Co are at least partially insoluble, and solid-liquid separation, thereby obtaining a Li-depleted Ni—Co-bearing residue susceptible to be acid-leached;

However, it is more preferred to remove even more Li in step 2 of the process since this would lower the Li:M ratio in the subsequent leaching step 3 even further and increase the advantageous effect. Therefore, in another embodiment, the metal concentration is 135 g/L or more (in a sulphate matrix), which corresponds to a Li:M ratio of 0.30 or lower, more preferably 139 g/L or more (in a sulphate matrix), which corresponds to a Li:M ratio of 0.20 or lower.

Similar beneficial effects as described for a sulphate matrix are observed for a chloride or nitrate matrix.

Lowering the Li:M ratio to 0.50 or less, preferably 0.30 or less and more preferably 0.20 or less is advantageous in the crystallization step 4 of the present invention, since purer crystals, i.e. not contaminated with Li, can be produced. Obtaining purer Ni- and/or Co-crystals is advantageous for the production of, for example, cathode active materials, potentially avoiding additional process or purification steps.

Furthermore, reagent consumption is significantly lower when removing Li prior to the leaching step. For example, acid consumption during step 3 of the process is already 5% lowered when around 30% of the Li in the starting material is removed in step 2.

In another embodiment, the thermal treatment process of step 2 is performed at a temperature above 250° C. A variety of reducing agents can be used in the thermal treatment process, for example, but not limited to, metallic powders, anode material, sulfur, carbon, CO, $CO_2$, $CH_4$, $H_2S$, $SO_2$, $NaHSO_4$ or H2. The anode material can serve as reducing agent.

In another embodiment, the step of selectively removing at least one water-soluble Li-compound by washing with an aqueous solution is performed at a pH of 2.5 or higher. Selective removal means selective with respect to Ni and Co.

In another embodiment of the process, the water-soluble Li-compound of step 2 comprises one or more of $Li_2O$, $Li_2CO_3$, $LiHCO_3$, $LiCl$, $Li_2SO_4$, $LiF$, $LiOH$. The respective counter-ions for Li may originate from the potentially different kinds of starting materials used in the recycling process or from the added reducing agents.

In another embodiment of the process, the Ni—Co-bearing phase of the pyrometallurgical smelting process of step 2 is comminuted to a particle size distribution with an average diameter of 10 mm or less, preferably 1 mm or less, and more preferably 0.5 mm or less. This is advantageous for an efficient and fast leaching in process step 3. Comminuting to such an average particle size distribution is done by standard methods known to the person skilled in the art, such as granulation, atomization or milling.

In another embodiment, process step 2 can be performed using hydrometallurgical processes that selectively leach lithium by operating under close control of a specific pH, temperature and oxidation-reduction potential. The selective dissolution can be done with water, called selective washing, or upon addition of a specific leaching agent, for example, but not limited to, phosphoric acid or oxalic acid or in the presence of an oxidizing agent such as, but not limited to, persulfate, ozone, chlorine. Other hydrothermal processes subject the battery scrap to an elevated temperature above normal leaching conditions, for example>80° C., or use mechanical energy such as, but not limited to, a wet crushing process to liberate lithium to a soluble Li salt. In a preferred embodiment, mineral acid is one or more of $HNO_3$, $H_2SO_4$ and HCl.

For economic reasons, the Li-depleted, Ni- and Co-bearing solution after step 3 of the process contains preferably at least 35%, more preferably at least 50%, more preferably at least 75% and most preferably at least 90% or more of the Ni and Co that was present in the starting material. One or more side products containing the remaining part of the Ni and Co are then also obtained, which can undergo further recycling processes.

The leaching yield in process step 3 can be optimized by adding a reducing agent or oxidizing agent. Reducing agents that can be used in step 3 are, but not limited to, sulfide components, sulfur, sulfur dioxide, sulfite components, hydrogen peroxide, metallic compounds, hydrogen. Oxidizing agents that can be used in step 3 are, but not limited to, persulfate, oxygen, hydrogen peroxide, chlorine, ozone.

Optionally, process step 3 can be performed under specific conditions, controlled pH and oxidation-reduction potential and/or with specific reagents, thereby minimizing dissolving impurities such as Mn, Fe, Cu, Al. This is a clear advantage of this process step since it increases Ni and Co concentration in the Ni- and Co-bearing solution after leaching.

Such a process to avoid dissolution of Cu is obtained by controlling the oxidation-reduction potential of the acidic solution below 200 mV vs. Ag/AgCl and by maintaining the pH of the acidic solution below 4. In another such a process Co and Ni are selectively leached from Cu in the presence of a reagents containing sulfur which results in a Co- and Ni-bearing solution and leach residue containing Cu.

In another embodiment, the process comprises a purification step between step 3 and step 4, wherein the Ni- and Co-bearing solution from step 3 also contains Cu and/or Fe and/or Al, wherein in the purification step Cu and/or Fe and/or Al are removed from the Ni- and Co-bearing solution. Removal of one or more of the impurities can be performed prior to solid-liquid separation in step 3.

The removal of Fe can be dealt with by imposing oxidizing conditions to the solution, so as to precipitate a Fe3+ compound, preferably using $O_2$ or $H_2O_2$ as an oxidizing agent.

Cu removal can be performed by standard processes known to the person skilled in the art, such as cementation or ion exchange.

Al can be removed by standard processes known to the person skilled in the art, such as solvent extraction or hydrolysis.

In another embodiment, the Ni- and Co-bearing solution from step 3 also contains Mn, wherein the process comprises a Mn-removal step between step 3 and step 4, wherein Mn is removed from the Ni- and Co-bearing solution. Mn can be removed from such Ni- and Co-bearing solution for example by solvent extraction or oxidative precipitation as $Mn^{4+}$ compound.

It is noted that crystallization in process step 4 includes a simultaneous co-crystallization of a Ni- and a Co-compound, respectively a simultaneous co-crystallization of a Ni- and a Co- and a Mn-compound.

Preferably, the process is free from a solvent extraction or ion exchange step in which Ni and/or Co are extracted from the Ni- and Co-bearing solution. This contrasts with traditionally used processes, in which Ni and/or Co are extracted from Ni- and Co-bearing solutions by specifically applying said methods in order to obtain sufficiently pure Co- and/or Ni salts. Hence, the advantage of this process is that no expensive chemicals such as ion exchange solids or solvents for solvent extraction, as well as their stripping agents, are needed compared to extracting a major part of the metals a process wherein the desired elements Ni and Co, and possibly Mn, would be extracted from the solution. On the other hand, it remains always possible to add purification steps before a final crystallization step to remove specific metals from the Ni- and Co-bearing solution. For example, if the target is to produce pure nickel crystals, the cobalt can be removed prior to crystallizing.

As additional advantage, the crystallization step, step 4, offers a purification step for trace impurities which are still present in the solution after step 3 and possible refining steps. Furthermore, crystallization also offers a purification step towards the residual Li. With low Li:M ratio, Li preferably reports to the liquid solution during crystallization of Ni and/or Co. Residual Li is Li that is not removed during step 2 and, consequently, can be present in the Ni- and Co-bearing solution obtained in step 3.

In another embodiment, before step 4 of the process the ratio of Ni to Co in the Ni- and Co-bearing solution is adjusted to a desired value by addition of Ni and/or Co in dissolved form or as one or more compounds which are soluble in the Ni- and Co-bearing solution. This way a crystallized product can be made that has already the desired Ni to Co ratio for a selected specific cathode active material, potentially avoiding additional process or purification steps during production of those materials.

In another embodiment, before step 4 of the process the ratio of Ni to Co to Mn in the Ni- and Co-bearing solution is adjusted to a desired value by addition of one or more of Ni, Co and Mn in a dissolved form or as one or more compounds which are soluble in the Ni- and Co-bearing solution. This way a crystallized product can be made that has already the desired Ni to Co to Mn ratio for a selected specific cathode active material, potentially avoiding additional process or purification steps during production of those materials.

The presence of Mn in the starting material is optional. Considering the low cost and good availability of suitable of Mn-containing chemicals, even a Ni- and Co-bearing solution without Mn can be used for preparing precursors for active materials for Ni—Co—Mn containing batteries, with an Mn source being added later.

In another embodiment the Ni- and Co-bearing solution contains more Ni than Co, when expressed in g/l.

In another embodiment the Ni- and Co-bearing solution contains more Ni than the sum of Co and Mn, when expressed in g/l.

In another embodiment, the process comprises a purification step between step 3 and step 4, wherein Co is selectively removed from the Ni- and Co-bearing solution, resulting in a Co-depleted, Ni-bearing solution, suitable for obtaining Ni crystals.

In another embodiment of the process, the starting material contains Ni, Co, Li, Al, F, and one or more of Cu and Fe, wherein the pyrometallurgical smelting process of step 2 is a reducing smelting of the starting material with fluxing agents, wherein the Ni—Co-bearing phase is an alloy comprising a major part of Ni, Co, Cu and at least part of the Fe and, wherein the alloy is depleted in Li, Al and F.

With major part is meant at least 50%, preferably 75% and more preferably 90% or more of the

DETAILED DESCRIPTION

In the drawings and the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

The invention is further illustrated in the following examples:

EXAMPLE 1

End of life batteries are recycled in a 60-liter alumina crucible. The end-of-life batteries contain 10 wt % Al, 2 wt % Fe, 4 wt % Mn, 4 wt % Co, 9 wt % Cu, 13 wt % Ni, 2.5 wt % Li, 25 wt % C. The rest comprises for example elements such as hydrogen, oxygen and fluorine.

A starting slag is heated to a temperature of 1450° C. using an induction furnace. Once this temperature is reached, a mixture of end-of-life batteries and fluxes are gradually added to the liquid slag over a period of 2 hours. Over this time, 50 kg of batteries are added together with 10 kg of limestone and 5 kg of sand. The Li:M ratio is 1.53 for a starting material including the end of life batteries, starting slag and fluxing agents as described. $O_2$ is blown at a rate of 220 L/h above the bath during the loading of the feed to combust any metallic Al and carbon in the batteries. Once the final addition is made, CO is blown through the bath at a rate of 300 L/h for 1 hour to obtain the desired reduction degree. Thereby, a slag phase and an alloy phase are formed. Samples are taken from the slag and the alloy and the phases are separated after cooling. The composition of the resulting phases is shown in Table 1.1, the remainder of the mass are fumes. During this pyrometallurgical smelting step, the removal yield of Li is 100%.

TABLE 1.1

| Detailed material balance of the smelting operation with compositions in wt. % | | | | | | | | | | |
|---|---|---|---|---|---|---|---|---|---|---|
| Input | Mass (kg) | Al | Si | Ca | Fe | Mn | Co | Cu | Ni | Li | C |
| Starting slag | 20 | 20 | 13 | 19 | — | 3 | 0.2 | | 0.1 | 4 | |
| Limestone | 10 | — | 2.2 | 38.0 | — | — | — | — | — | — | 11.7 |
| Sand | 5 | — | 46.7 | — | — | — | — | — | — | — | — |
| Output | Mass (kg) | Al | Si | Ca | Fe | Mn | Co | Cu | Ni | Li | |
| Alloy | 15 | <0.1 | <0.1 | <0.1 | 6.6 | 5.8 | 13.6 | 30.0 | 43.5 | <0.1 | |
| Slag | 43 | 19.8 | 11.8 | 17.6 | 0.1 | 4.0 | 0.2 | <0.1 | 0.1 | 3.0 | |
| Distribution (%) | | Al | Si | Ca | Fe | Mn | Co | Cu | Ni | Li | |
| Alloy | | <0.1 | <0.1 | <0.1 | 92.0 | 33.3 | 95.9 | 99.1 | 99.1 | <0.1 | |
| Slag | | 100.0 | 100.0 | 100.0 | 8.0 | 66.7 | 4.1 | 0.9 | 0.9 | 100.0 | |

Part of the alloy phase from the smelting operation is re-melted under inert atmosphere and atomized in a water jet. This yields a powder fraction with an average particle diameter of 0.2 mm.

600 g of the atomized powder is added to a glass beaker filled with 3.2 L water. An agitator is used for suspending the powder and for the distribution of oxygen gas that is injected at the bottom of the beaker. The oxygen acts as an oxidizing agent during leaching. The mixture is heated and maintained at 80° C. 1.05 L of 998 g/L sulfuric acid is supplied to dissolve the powder over a period of 8 hours. After 9 hours, the leaching step is completed, at which stage basically all metal is dissolved. The beaker is cooled, and the content is filtered. The volume of the obtained leach filtrate is 4.05 L and the filtrate comprises 60 g/L Ni, 19 g/L Co, 8.0 g/L Mn, 38 g/L Cu, 9.1 g/L Fe, <0.1 g/L Al, with a Li:M ratio of 0.

Next, Cu is selectively removed from this solution by cementation with Ni powder. This is performed by slowly pumping the leach solution into another heated and agitated beaker while simultaneously adding 184 g of metallic Ni powder to the same beaker. During this process, Ni exchanges with Cu in solution. After filtration, a mixed Cu—Ni cement, and a de-coppered solution is obtained.

In a next step, Fe is removed by precipitation as a hydroxide. This is performed by reheating the de-coppered solution to 80° C. Oxygen gas is injected in the agitated beaker and 135 g of $NiCO_3$ is added during 3 hours. Under these conditions, $Fe(OH)_3$ is precipitated. After filtration, an iron-rich cake and 3.9 L of filtrate are obtained. The filtrate comprises 108 g/L Ni, 18 g/L Co, 7.7 g/L Mn, <0.01 g/L Cu, <0.01 g/L Fe, <0.1 g/L Al.

The Co, Mn and Ni concentrations are then corrected to achieve a desired Ni to Co to Mn ratio before final crystallization of a mixed Ni—Co—Mn sulfate. In this example we aim for a molar ratio of Ni:Co:Mn of 6:2:2. This is achieved by reheating the solution in an agitated beaker at 80° C., adding 323 g cobalt sulfate heptahydrate and 336 g manganese sulfate monohydrate crystals. Also 1.3 L of water is added in this step to obtain a filtrate comprising 80 g/L Ni, 27 g/L Co, 26 g/L Mn, <0.01 g/L Cu, <0.01 g/L Fe, <0.1 g/L Al.

Evaporative crystallization is performed at 45° C. and under vacuum. At the end of the crystallization step, mixed nickel, cobalt and manganese sulfate crystals are obtained. The crystals comprise 16.1% Ni, 4.6% Co, 3.5% Mn, <0.002% Cu, <0.002% Fe, <0.002% Al. The rest consists of sulfates and hydration water.

EXAMPLE 2

Mechanically pretreated cathode foil production waste, called black mass, is first thermally pretreated in presence of a reducing agent C in order to remove Li prior to leaching. The black mass contains 33% Ni, 11% Co, 10% Mn, <0.1% Cu, <0.1% Fe, 0.4% Al, 6.1% Li. The rest comprises for example elements such as oxygen, carbon and fluorine. The Li:M ratio of the starting material is 0.94.

300 g of black mass, mechanically pretreated cathode foil production waste with a composition stated above, is mixed with 15.6 g Carbon and 244.8 g $CaCl_2.2H_2O$. This mixture is put in in a tray and heated to a temperature of 700° C. in an electric furnace while the furnace is constantly purged with $N_2$ flow. The temperature of 700° C. is maintained for a period of 6 hours. Over this time, the Ni, Mn and Co oxides are (partly) reduced and a water-soluble Li salt, i.e. $Li_2CO_3$ and/or LiCl, are formed. After 6 hours, the furnace with mixture is cooled down to room temperature under $N_2$ atmosphere.

350 g of the produced mixture is added to a glass beaker filled with 1L water. An agitator is used for suspending the powder. The mixture is heated and maintained at 80° C. 32 mL of sulfuric acid (970 g/L) is slowly supplied over 3 hours to optimize the dissolution of Li. After 5 hours, the beaker is cooled, and the content is filtered. At the end of pyrolysis and washing, 261 g of Ni, Co and Mn containing concentrate and 1.3 L Li filtrate are obtained. The mass balance of this pretreatment operations is shown in Table 2.1. 88% of the Li is removed during this step.

TABLE 2.1

Detailed material balance of the pyrolyzing and washing operation. The composition of the Ni—Co—Mn concentrate is based on the residue after drying.

| Input | Ni | Co | Mn | Cu | Fe | Al | Li |
|---|---|---|---|---|---|---|---|
| Li filtrate (g/L) | 0.1 | 0.05 | 0.2 | <0.05 | <0.05 | <0.05 | 10.5 |
| Ni—Co—Mn concentrate (wt %) | 30 | 10 | 9 | <0.1 | <0.1 | 0.4 | 0.7 |

Subsequently, 261 g Ni, Mn, Co concentrate is added to a glass beaker filled with 0.8 L water. An agitator is used for suspending the powder. The mixture is heated and maintained at 80° C. 241 mL of sulfuric acid (998 g/L) is slowly supplied during 3 hours to dissolve the powder. At the end of leaching, 56 mL of 35% hydrogen peroxide is added as a reducing agent. After 4 hours in total, the leaching step is completed, at which stage basically all metal is dissolved. The beaker is cooled, and the content is filtered. 1.02 L of leach filtrate is obtained, and the solution contains 76 g/L Ni, 25 g/L Co, 23 g/L Mn, <0.01 g/L Cu, <0.01 g/L Fe, 0.7 g/L Al, 1.5 g/L Li, with a Li:M ratio of 0.10.

Next, the pH of the filtrate is increased in order to selectively remove Al from this solution. First, the leach filtrate is in a glass beaker heated and maintained at 80° C. An agitator is used for ensuring a homogenous solution. 8.5 g of $CoCO_3$ is added to the leach solution. After three hours, the Al is removed from the solution to very low levels and the content is filtered. The purified solution contains 76 g/L Ni, 27 g/L Co, 23 g/L Mn, <0.05 g/L Cu, <0.05 g/L Fe, <0.05 g/L Al, 1.5 g/L Li.

Evaporative crystallization is performed at 60° C. As a result, mixed nickel, cobalt and manganese sulfate crystals are formed. The crystals contain 15.7% Ni, 5.2% Co, 2.3% Mn, <0.002% Cu, <0.002% Fe, <0.002% Al, <0.01% Li. The rest consists of sulfates and hydration water.

EXAMPLE 3

200 g of nickel-cobalt-aluminium (NCA) cathode production scrap is treated. The production scrap contains 48% Ni, 9% Co, <0.1% Mn, 2% Al, 7% Li. The rest comprises for example elements such as oxygen. The Li:M ratio of the starting material is 1.04.

The 200 g of cathode production scrap is added in a 2L reactor with 1L water. This mixture is agitated and heated to a temperature of 80° C. on a heating plate. 220 mL of sulfuric acid with concentration of 987 g/L is added in 6 hours. In such conditions, Li dissolves, whereas trivalent Co and Ni do not dissolve. After six hours, the solid-liquid mixture is filtered on a Buchner filter. Around 1.1 L of filtrate is recovered. By this operation, the majority of the Lithium is leached and present in the filtrate. 107 g of a Li-depleted residue is obtained that is rich in Ni and Co. The composition of the filtrate and residue after drying can be found in Table 3.1. The Li removal yield is more than 99% in the selective Li leaching step.

TABLE 3.1

Detailed material balance of the hydrometallurgical pretreatment operation.

| | Ni | Co | Mn | Al | Li |
|---|---|---|---|---|---|
| Filtrate (g/L) | 35 | 5.3 | <0.05 | 1.6 | 13 |
| Ni—Co concentrate (wt %) | 54 | 10 | <0.1 | 2 | 0.1 |

The Ni—Co concentrate is added to a glass beaker filled with 0.4 L water. An agitator is used for suspending the powder. The mixture is heated and maintained at 80° C. 130 mL of concentrated sulfuric acid (998 g/L) is slowly supplied to dissolve the powder. 77 mL of 35% hydrogen peroxide is added as a reducing agent during leaching. After 8 hours, the leaching step is completed. The beaker is cooled, and the content is filtered. The leach solution (550 mL) contains 102 g/L Ni, 19 g/L Co, <0.05 g/L Mn, 3.8 g/L Al, 0.2 g/L Li, with a Li:M ratio of 0.01.

The leach solution is then heated to 80° C. in a glass beaker. When on temperature, 16.4 g $NiCO_3$ and 2.7 g $CoCO_3$ are added. An agitator is used for ensuring a homogenous solution. Ni and Co are thereby dissolved, while Al is selectively precipitated and removed from the solution. The purified filtrate contains 112 g/L Ni, 21 g/L Co, <0.05 g/L Mn, <0.05 g/L Al, 0.2 g/L Li.

The Ni- and Co-concentrations are then corrected to achieve a desired Ni to Co ratio before final crystallization of a mixed Ni—Co sulfate crystal. In this case we aim for a molar ratio of Ni:Co of 6:2. This is achieved by reheating the solution in an agitated beaker at 80° C., adding 45 g of cobalt sulfate heptahydrate crystals. Also 100 mL of water is added in this step to obtain a filtrate containing 96 g/L Ni, 32 g/L Co, <0.05 g/L Mn, <0.05 g/L Al, 0.2 g/L Li.

Evaporative crystallization is performed at 20° C. As a result, mixed nickel, cobalt and sulfate crystals are formed. The crystals contain 17.6% Ni, 5.8% Co, <0.001% Mn, <0.001% Al, 0.001% Li. It is assumed that a mixture of $NiSO_4.6H_2O$ and $CoSO_4.7H_2O$ is formed and that the rest comprises sulfates and hydration water. The weight ratio of Ni to Co is 3.03, confirming the desired molar ratio.

The invention claimed is:

1. A process for the recovery of metals M from a Li-containing starting material, wherein M comprises Ni and Co, comprising the steps of:
   Step 1: Providing said starting material, comprising Li-ion batteries or their derived products;
   Step 2: Removing Li in an amount of more than the maximum of (1) 30% of the Li present in said starting material, and (2) a percentage of the Li present in said starting material determined to obtain a Li:M ratio of 0.70 or less in a subsequent acidic leaching step, by using either one or more of:
   a pyrometallurgical smelting process comprising heating and introducing a reducing agent and slag-formers, thereby producing one or more of a Li-bearing slag phase and Li-fumes, and a Li-depleted Ni—Co-bearing phase susceptible to be acid-leached;
   a thermal treatment process comprising heating and introducing a reducing agent, thereby producing a Ni—Co-bearing residue containing at least one water-soluble Li-compound, and removing said at least one Li-compound by washing with an aqueous solution, thereby obtaining a Li-depleted Ni—Co-bearing residue susceptible to be acid-leached;
   a hydrometallurgical leaching process comprising introducing an aqueous or acidic solution, thereby leaching Li from said starting material, wherein Ni and Co are at least partially insoluble, and solid-liquid separation, thereby obtaining a Li-depleted Ni—Co-bearing residue susceptible to be acid-leached;
   Step 3: Subsequent leaching using relative amounts of Li-depleted Ni—Co-bearing material, obtained in step 2, and a mineral acid, thereby obtaining a Ni- and Co-bearing solution; and,
   Step 4: Crystallization of Ni, Co, and optionally Mn, wherein step 4 is performed by lowering the temperature of the Ni- and Co-bearing solution and/or by removing water from the Ni- and Co-bearing solution and/or by solvent displacement crystallization.

2. The process according to claim 1, wherein the thermal treatment process of step 2 is performed at a temperature above 250° C.

3. The process according to claim 1, wherein the step of removing said at least one water-soluble Li-compound by washing with an aqueous solution is performed at a pH of 2.5 or higher.

4. The process according to claim 1, wherein said at least one water-soluble Li-compound of step 2 comprises one or more of $Li_2O$, $Li_2CO_3$, $LiHCO_3$, $LiCl$, $Li_2SO_4$, $LiF$, $LiOH$.

5. The process according to claim 1, wherein the mineral acid is one or more of $HNO_3$, $H_2SO_4$ and $HCl$.

6. The process according to claim 1, wherein the Ni—Co-bearing phase of the pyrometallurgical smelting process of step 2 is comminuted to a particle size distribution with an average diameter of 10 mm or less.

7. The process according to claim 1, wherein the Ni- and Co-bearing solution from step 3 also contains Cu and/or Fe and/or Al, wherein the process comprises a purification step between step 3 and step 4, wherein Cu and/or Fe and/or Al are removed from the Ni- and Co-bearing solution.

8. The process according to claim 1, wherein the Ni- and Co-bearing solution from step 3 also contains Mn, wherein the process comprises a Mn-removal step between step 3 and step 4, wherein Mn is removed from the Ni- and Co-bearing solution.

9. The process according to claim 1, wherein before step 4 the ratio of Ni to Co in the Ni- and Co-bearing solution is adjusted to a desired value by addition of Ni and/or Co in dissolved form or as one or more compounds which are soluble in the Ni- and Co-bearing solution.

10. The process according to claim 1, wherein before step 4 the ratio of Ni to Co to Mn in the Ni- and Co-bearing solution is adjusted to a desired value by addition of one or more of Ni, Co, and Mn in a dissolved form or as one or more compounds which are soluble in the Ni- and Co-bearing solution.

11. The process according to claim 1, wherein the Ni- and Co-bearing solution contains more Ni than Co, when expressed in g/l.

12. The process according to claim 1, wherein the Ni- and Co-bearing solution contains more Ni than the sum of Co and Mn, when expressed in g/l.

13. The process according to claim 1, comprising a purification step between step 3 and step 4, wherein Co is selectively removed from the Ni- and Co-bearing solution, resulting in a Co-depleted, Ni-bearing solution, suitable for obtaining Ni crystals.

14. The process according to claim 1, wherein the starting material contains Ni, Co, Li, Al, F, and one or more of Cu and Fe, wherein the pyrometallurgical smelting process of step 2 is a reducing smelting of the starting material with fluxing agents, wherein the Ni—Co-bearing phase is an alloy comprising a major part of Ni, Co, Cu and at least part of the Fe and, wherein the alloy is depleted in Li, Al and F.

* * * * *